Dec. 9, 1930.  C. P. KIRKPATRICK  1,784,602
VALVE FOR OIL WELL PUMPS
Filed Jan. 14, 1928  2 Sheets-Sheet 1
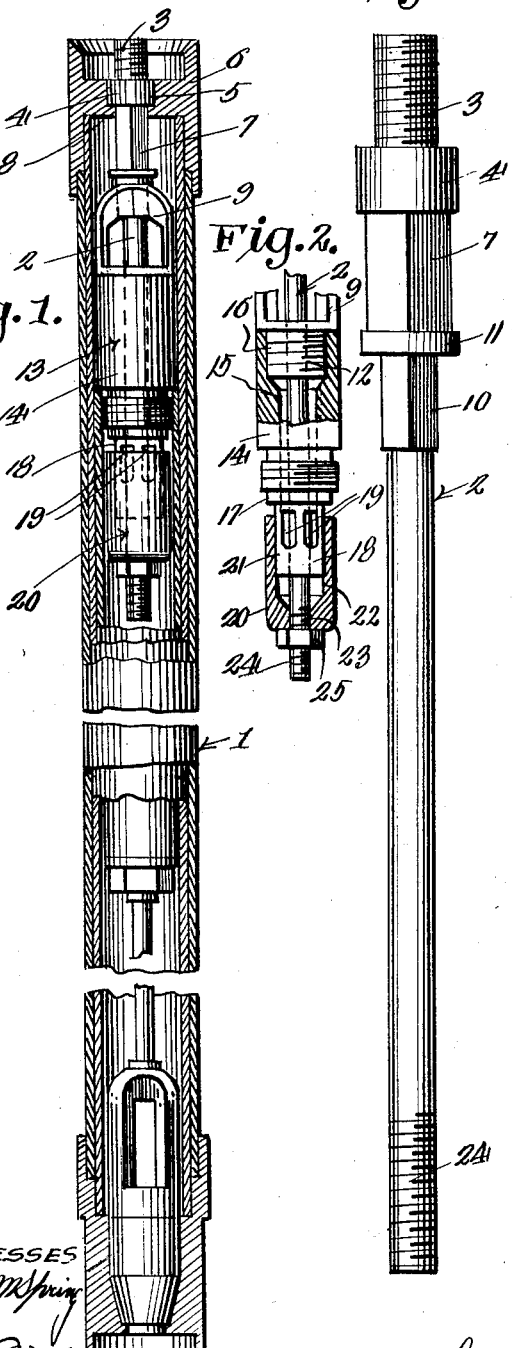
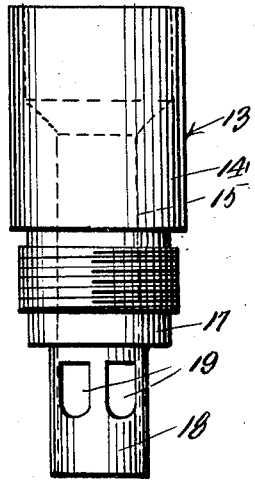
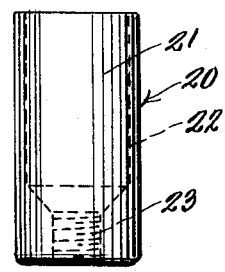
INVENTOR.
CARROLL P. KIRKPATRICK
BY
ATTORNEYS.

Dec. 9, 1930.  C. P. KIRKPATRICK  1,784,602
VALVE FOR OIL WELL PUMPS
Filed Jan. 14, 1928  2 Sheets-Sheet 2
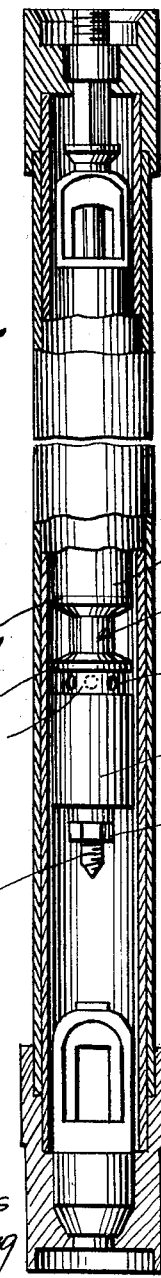
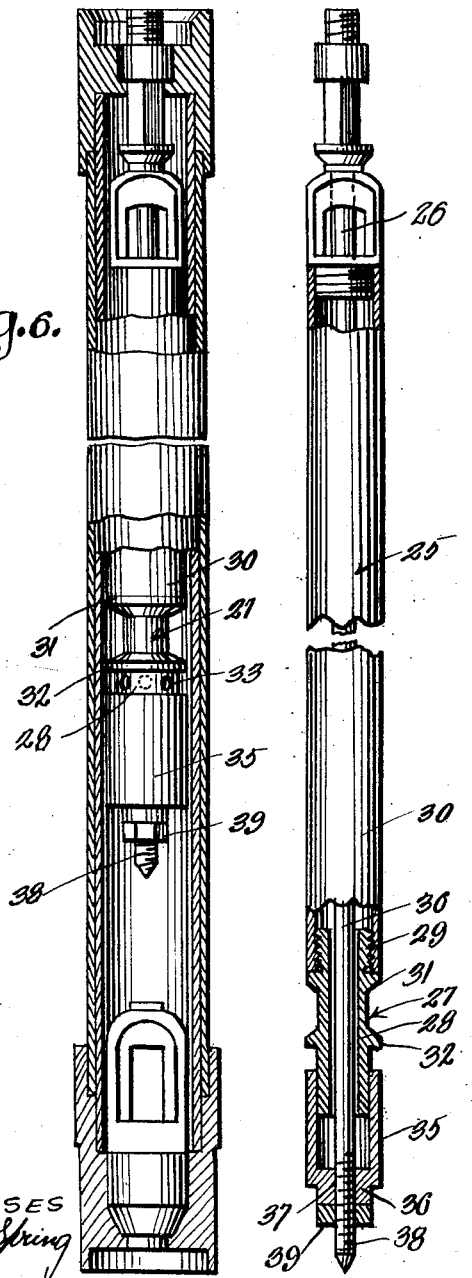
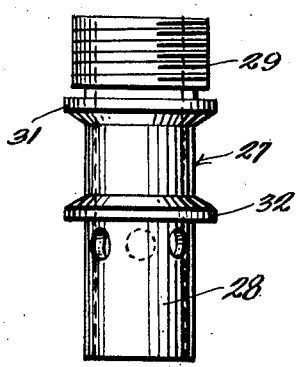
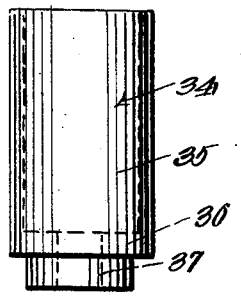
INVENTOR.
CARROLL P. KIRKPATRICK
BY
Irving L. Cathran
ATTORNEYS.

Patented Dec. 9, 1930

1,784,602

UNITED STATES PATENT OFFICE

CARROLL P. KIRKPATRICK, OF FELLOWS, CALIFORNIA, ASSIGNOR OF ONE-HALF TO R. M. SMITH, OF FELLOWS, CALIFORNIA

VALVE FOR OIL-WELL PUMPS

Application filed January 14, 1928. Serial No. 246,791.

This invention relates to improvements in oil well pumping apparatus and more particularly to an improved valve for the plunger of the apparatus.

Ordinarily, the plunger of an oil-well pump is equipped with a ball check valve for trapping the oil accumulated on each down stroke of the pump plunger, but it has been found that such valves are unsatisfactory, chiefly for the reason that pieces of shale and gravel are liable to lodge on the seat of the ball valve and prevent closing of the valve, with a consequent impairment of the efficiency of the pump. Likewise, where there is an excessive volume of gas, in the well, valves of the type referred to will not function efficiently and the output of the well is materially reduced. Therefore, the present invention has, for a further object, to provide a valve, designed to replace the usual ball check valve and so constructed that it will be positively closed on each up stroke of the pump plunger, regardless of the presence of shale or gravel or an excess volume of gas, the valve being so constructed and arranged that the same is, as stated, positively closed, as distinguished from the mere gravity and pressure controlled closing of the ordinary ball check valve.

Another object of the invention is to provide a valve possessing the characteristics above outlined and which valve may be readily installed, in connection with the plunger of an oil well pump, to replace the ordinary ball check valve, without otherwise altering the construction of the plunger of the pump.

Another object of the invention is to provide a valve for the purpose stated which will function in a manner to greatly increase the output of the pump, with the plunger of which it is assembled.

While the accompanying drawings and the description which is to follow, constitute a disclosure of the preferred embodiment of the invention, it will be understood that various changes may be made within the scope of what is claimed.

In the accompanying drawings:

Figure 1 is a view partly in elevation and partly in vertical section illustrating one embodiment of the invention, the valve, embodying the invention being, in this instance, installed at the upper portion of the pump plunger;

Figure 2 is a vertical diametric sectional view through the valve, parts being shown in elevation;

Figure 3 is a view in side elevation of the stem of the valve;

Figure 4 is a view in side elevation of one member of the valve;

Figure 5 is a similar view of another member of the valve;

Figure 6 is a view similar to Fig. 1 illustrating another embodiment of the invention in which the valve is mounted at the lower portion of the plunger;

Figure 7 is a view partly in vertical section and partly in elevation illustrating the arrangement of the valve in connection with the plunger;

Figure 8 is a view similar to Figure 4 illustrating the corresponding member of the valve, of this embodiment;

Figure 9 is a view similar to Fig. 5 illustrating the corresponding other member of the valve.

In the embodiment of the invention illustrated in Figures 1 to 5 inclusive, the usual working barrel is indicated in general by the numeral 1 and the operating stem therefor and for the valve embodying the invention, is indicated in general by the numeral 2. The stem 2 is threaded at its upper end, as at 3, for the connection thereto of the usual pump rod, (not shown) and, as is usual, this end of the stem is provided with a cylindrical enlargement 4 which is adapted, on the down stroke of the plunger, to seat in a correspondingly formed socket 5 in the usual coupling 6 provided at the upper end of the body of the plunger, the stem 2 below the enlargement 4, being provided with the usual square portion 7 which works slidably in the usual squared opening 8 formed at the bottom of the socket 5 in the coupling 6. The numeral 9 indicates a guide yoke which has a squared opening in its upper portion to slidably accommodate a reduced squared portion 10, of less cross-sectional dimensions than the portion 7, constituting a part of the stem 2, and located beneath a collar 11 which constitutes an integral part of the said stem, which collar, on the down stroke of the plunger, acts against the upper end of the guide yoke 9. The guide yoke 9 is provided at its lower end with a threaded neck 12 which provides for the connection, to the yoke, of that member of the valve, embodying the invention, which is shown in Figure 4 of the drawings.

The said member is indicated in general by the numeral 13 and comprises an exteriorly cylindrical body 14 having a bore 15 formed therein which bore is increased in diameter at the upper end of the body as indicated by the numeral 16, and is interiorly threaded to accommodate the neck 12 of the yoke 9, the neck of the yoke being threaded into the end of the bore with the bottom of the yoke abutting against the upper end of the body 14 of the valve member. At its lower end, the body 14 of the valve member 13 is reduced in diameter, as indicated by the numeral 17, and then further reduced in diameter to provide a hollow cylindrical downward extension 18 which is formed, at spaced points in its circumference, and adjacent the under side of the portion 17, with ports 19 for the passage of the oil. The valve stem 2 extends downwardly through the bore of the valve member 13, the said stem being of a diameter less than that of the said bore, whereby to provide for passage of the oil upwardly through the bore and through the bore of the neck 12 of the yoke 9.

The other member of the valve, illustrated in Figure 5 of the drawing, is indicated in general by the numeral 20, and the said member comprises an exteriorly cylindrical body 21 having a bore 22 therein, the upper portion of which is of a diameter to accommodate the extension 18 of the body 14 of the valve member 13, the said body 21 being, in other words, of substantially hollow cylindrical form and being slidably fitted upon the extension 18 of the valve member 13 as clearly shown in Figures 1 and 2 of the drawings. The lower end of the bore 22 of the body 21 of the valve 20 is reduced in diameter as indicated by the numeral 23, and the lower end of the valve stem 2 is fitted through this reduced portion of the bore as best shown in Fig. 2 of the drawings, this end of the valve stem being threaded as indicated by the numeral 24 for threaded engagement with the said reduced portion 23 of the bore 22, and a lock nut 25 is fitted onto the said end 24 of the valve stem and is tightened to bind against the lower end of the valve member 20. In this manner, the member 20 of the valve is adjustably mounted upon the lower end of the valve stem, and inasmuch, as in the sliding movement of the member 20 upon the extension 18 of the member 13, the ports 19 are to be closed, on the upstroke of the plunger and uncovered on the down stroke of the plunger, the extent to which the ports are uncovered on the latter stroke, may be determined or regulated by adjusting the said member 20 and then securing the same in its position of adjustment by tightening the lock-nut 25.

From the foregoing description of this embodiment of the invention, it will be evident that due to the connection of the valve member 21 with the stem 2, the member will be positively shifted in a downward direction, on the downstroke of the stem and plunger with which it is associated, thus positively opening the valve by exposing a greater or less area of the ports 19, depending upon the adjustment of the member 20 upon the lower threaded end of the stem 2. Likewise, on the upstroke of the stem 2 and the plunger with which it is associated, the member 20 of the valve will be positively shifted in an upward direction so as to insure complete closing of the ports 19 thereby preventing any leakage of the oil which has been trapped by the closing of the valve. Consequently, the operation of the valve, of this embodiment of the invention, is a positive one as distinguished from the functioning of a ball check valve, as ordinarily employed, and therefore the output of the well, equipped with the valve, is greatly increased. It will likewise be evident that the valve cannot be prevented from closing because of the presence of particles of shale or small gravel, inasmuch as a direct and forceful thrust is exerted upon the member 20 of the valve both in an opening and closing movement thereof. It will also be evident that excessive gas pressure in the well cannot in any way interfere with proper functioning of the valve as is the case however, in the use of the ordinary ball check valve.

In the embodiment of the invention above described, the valve embodying the invention is associated with the upper portion of the plunger of the oil well pump, but in the embodiment shown in Figs 6, 7, 8 and 9 of the drawings, the invention is associated with the lower portion of the plunger. In this embodiment of the invention, the plunger is indicated in general by the letter A, and the plunger stem by the numeral 26, and the valve member which corresponds to the valve member 13 of the previously described embodiment of the invention, and which is indicated in general by the numeral 27, comprises a hollow approximately cylindrical body 28 having an exteriorly threaded upper end 29 which is fitted into the threaded lower end of the barrel 30 of the plunger A. The body 28 is formed, exteriorly, below its threaded upper end 29, with an annular circumscribing shoulder 31 which abuts against the lower end of the barrel 30 of the plunger, and the body is provided, below the shoulder 31, with a similar annular shoulder indicated by the numeral 32. Below the shoulder 32 the body is formed, at spaced points in its circumference, with ports indicated by the numeral 33.

The other member of the valve, which is indicated in general by the numeral 34, comprises a hollow, cylindrical body 35 which is interiorly of a diameter to slidably fit the lower portion of the body 28 of the valve member 27 as most clearly shown in Fig. 7 of the drawings, the body 35 being closed at its lower end as indicated by the numeral 36 and having a threaded opening 37 formed in its threaded end to accommodate the threaded lower end 38 of the plunger stem 26, the member 35 being adjustable upon the stem, in the same manner that the member 20 of the valve of the previously described embodiment is adjustable upon the stem 2. A lock nut 39 is threaded onto the lower end 38 of the stem 26 and is adapted to be tightened to bear against the lower end of the member 35 so as to hold the member in positions of adjustment.

From the foregoing description of this embodiment of the invention, it will be observed that the valve parts function in precisely the same manner as the parts of the previously described embodiment, a direct downward stroke being exerted by the stem 26, on the downward movement of the plunger A, to effect positive opening of the valve, and a direct and positive upward thrust being exerted upon the member 34 in the upward movement of the plunger and the stem 26, to effect a positive closing of the ports 33 by the said member 34. Therefore, the valve illustrated in Figs. 6 to 9 inclusive presents precisely the same advantages as the valve disclosed in Figs. 1 to 5 inclusive.

It will be evident that both forms of the valve embodying the invention are adapted for installation in lieu of the check ball valve now employed in the plungers of oil well pumps.

Having thus described my invention, what I claim as new is:—

In an oil well plunger valve, a stem having an abutment, a member having an oil conducting bore through which the stem slidably extends, the member being arranged below the abutment and being limited in its upward sliding movement thereby and having an abutment formed adjacent to its lower end and a port in its wall below the abutment for the passage of oil, a cup-shaped member stationary with respect to the stem and slidably receiving said member for controlling the flow of oil through said port, the cup-shaped member being engageable with the abutment of the first mentioned member for limiting the sliding downward movement thereof, and means for adjusting the cup-shaped member on the stem whereby to provide for variation of the area of the port controlled by said cup-shaped member.

In testimony whereof I affix my signature.
CARROLL P. KIRKPATRICK.